J. CUTHBERT.
ELECTRIC TERMINAL.
APPLICATION FILED DEC. 2, 1915. RENEWED MAR. 3, 1917.

1,258,657.

Patented Mar. 12, 1918.
2 SHEETS—SHEET 1.

Witnesses:
Robert H. Weir
Arthur W. Carlson

Inventor
John Cuthbert
Foree Bain May
Attys:

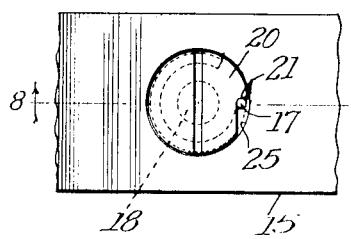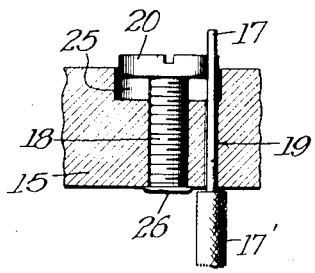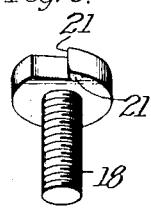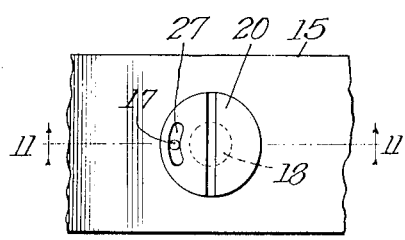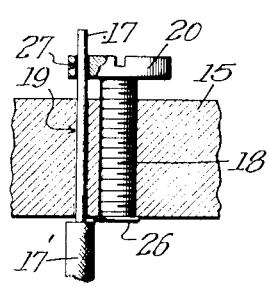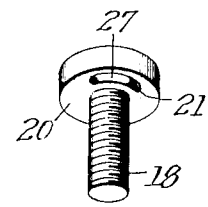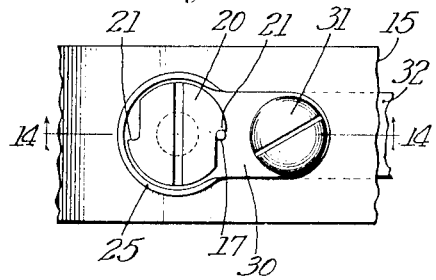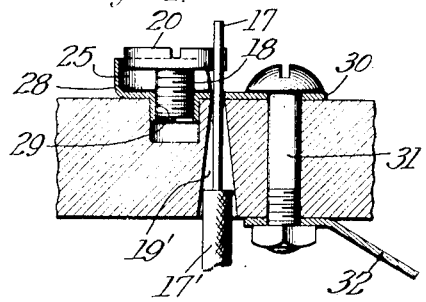

UNITED STATES PATENT OFFICE.

JOHN CUTHBERT, OF CHICAGO, ILLINOIS.

ELECTRIC TERMINAL.

1,258,657.  Specification of Letters Patent.  Patented Mar. 12, 1918.

Application filed December 2, 1915, Serial No. 64,635. Renewed March 3, 1917. Serial No. 152,436.

*To all whom it may concern:*

Be it known that I, JOHN CUTHBERT, a citizen of the United States, residing at Chicago, in the county of Cook and State of Illinois, have invented certain new and useful Improvements in Electric Terminals, of which the following is a specification.

My invention relates to wire clamping or binding terminals, especially adapted for connecting circuit wires or cables to electric translating devices or to other parts of electric circuits.

One of the objects of my invention is to modify the shape or form of the usual wire clamping member of a screw threaded structure, such as the head of a screw or a nut, so that it may be used to coil a wire around the shank or axis of such structure prior to clamping it in place.

Another object of my invention is to provide a gage or stop for the wire to determine the length of wire to be coiled about the shank.

Other and further objects of my invention will become readily apparent, to persons skilled in the art, from a consideration of the following description when taken in conjunction with the accompanying drawings forming a part hereof, wherein:—

Fig. 7 is a plan view of a slightly modified form of the device.

Fig. 8 is a central vertical section taken on line 8—8 of Fig. 7.

Fig. 9 is a perspective elevation of a modified clamping screw.

Fig. 10 is a plan view of another modification.

Fig. 11 is a central section taken on line 11—11 of Fig. 10.

Fig. 12 is a perspective elevation of another modified screw.

Fig. 13 is a plan view of another slightly modified form of the device.

Fig. 14 is a central vertical sectional view taken on line 14—14 of Fig. 13.

In all the views the same reference characters are employed to indicate similar parts.

Figure 1:
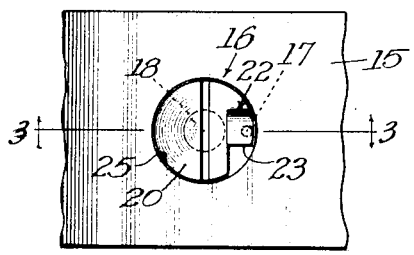
Figure 1 is a plan view of one form that my invention may take.
Figure 2:
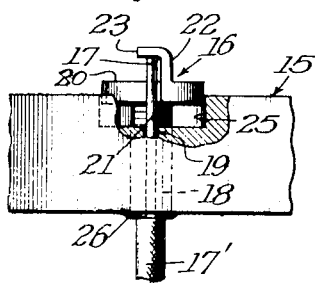
Fig. 2 is an elevation thereof, part in section.
Figure 3:
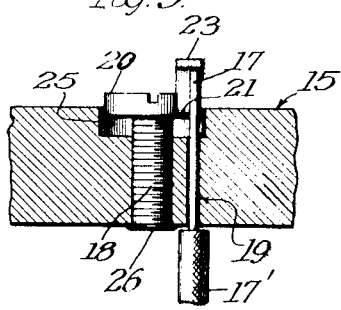
Fig. 3 is a central vertical section taken on line 3—3 of Fig. 1, showing the device with the wire inserted ready to be coiled and clamped.
Figure 6:
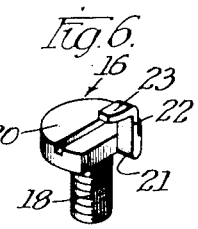
Fig. 6 is a perspective elevation of a clamping screw showing the wire stop or gage as a part thereof.

In my copending application, filed June 19th, 1915, Serial No. 35,064, I have shown a wire clamping device wherein a part projecting from the clamping member engages the wire to coil it about the axis or shank of the screw threaded member prior to clamping it. In my present invention the clamping means is not a projection from the screw threaded member, as in the former instance, but is provided by changing the configuration of the clamping means such as the head of a screw or nut without providing a part projecting therefrom to accomplish this result.

15 is a relatively stationary member or part of the clamping means through which the clamping screw 16 is threaded, and between which and the head of the screw the wire 17 is to be clamped. A shank 18 of the screw, is let into the stationary part 15 and said latter part is perforated as at 19 substantially parallel with the shank 18 for insertion of the wire 17. The head 20 of the screw, is provided with a shoulder 21 intermediate the extreme circumference of the head and the shank for engaging the wire. The perforation 19, through which the wire 17 is to be inserted, is within the path of the shoulder 21.

Figure 4:
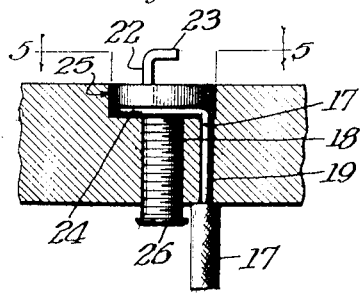
Fig. 4 is a sectional elevation similar to that shown in Fig. 2, but showing the wire coiled and clamped.

To provide the shoulder or hook 21 a portion of the screw head 20 is cut away, as shown in Figs. 7 and 9. In Figs. 7 to 14 the shoulder 21 is provided by cutting away and entirely removing a part of the head 20 of the screw, but in Figs. 1 to 5 inclusive instead of entirely removing the parts to provide the shoulders I extend and displace it vertically above the screw, as at 22, and laterally, as at 23, to provide the stop 23 to serve as a gage against which the end of the wire 17 abuts. The projection 23 serves as a gage to determine the length of wire that shall project through the perforation 19 and to subsequently be turned around the shank 21 of the screw. Such a gage is convenient, but not absolutely necessary to the operation of my clamping terminal. When the screw is turned in the proper direction the wire 17 is bent or turned around the shank of the screw, as at 24, in Fig. 5 and upon further turning of the screw the wire is clamped in place between the rotatable and stationary clamping members as shown in Fig. 4. To prevent the wire from being pushed laterally from under the head of the screw I prefer to counter-bore the parts 15, as shown at 25, with sufficient clearance to permit the entrance of the head 20 of the screw and not large enough to allow the wire to pass from under the head of the screw. The same general arrangement is shown in a different way in Fig. 14.

I may, furthermore, upset the end of the shank of the screw, when a screw is used, as at 26, to prevent entire withdrawal of the screw from its threaded perforation in the coöperating clamping member 15. The recess 25, provided as shown in Figs. 2, 3, 4, 5 or 14 may be convenient, but is not essential to the operation of the device. Figs. 10 and 11 show the absence of such a recess. In Figs. 10 and 12 I show an elongated slot 27, in the head of the screw 20, to provide a shoulder 21 instead of cutting the head of the screw away, as shown in Figs. 1 to 9 inclusive.

In Fig. 14 I provide a shell 28 having a recess 25 and having a screw threaded portion 29 in which the shank 18 of the screw is threaded. This part 28 may also have a laterally extending flat portion 30, perforated for a screw 31, to which an electric conducting part 32 may be connected. In this figure the perforation 19′, through the insulating base 15, is shown tapered and the insulation 17′ of the wire 17 may enter the perforation. The perforation is tapered so as to provide a guide for the wire 17 into and through the smallest portion of the perforation.

Two or more shoulders 21 may be provided in each of the screw heads and the under surface of the shoulder is preferably rounded so as not to cut the wire 17 when it engages the wire to turn it around the shank.

Figure 5:
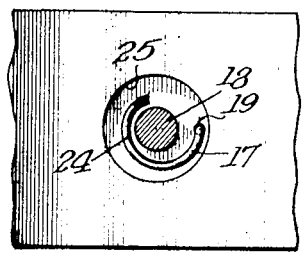
Fig. 5 is a transverse section taken on line 5—5 of Fig. 4.

From the foregoing description and the drawings the operation of the device is apparent. The wire 17 is inserted through the perforation 19 and extended a predetermined distance above the upper surface of the clamping member 15 and the screw 18 is turned until the shoulder or hook 21, provided on the head of the screw and lying in a plane at right angles to the axis of the shank, engages the substantially vertical wire. Upon further turning the screw the wire is bent down, and twisted or turned around the shank 18 of the screw, as shown in Fig. 5, whereupon the continuation of the rotation of the screw serves to clamp the bent down ring portion 24 of the wire 17 between the relatively stationary part 15 and the head of the screw.

While I have herein shown a wire 17, and referred to it as such, it is not necessarily a solid wire, as a stranded cable may be operated upon in the same manner and clamped by the same instrumentality as the wire, and while I have shown the perforation 19 as being substantially parallel with the shank of the screw 18 it is manifest that it may divert from parallelism and still come within the contemplation of my invention, and while I have herein shown a preferred form of my invention and several modifications it will be evident, to persons skilled in the art, that it is susceptible of many more modifications than those shown and is to be limited only within the scope of the appended claims.

Having described my invention, what I claim is:

1. A wire coiling and binding clamp comprising a relatively stationary clamping member providing a recess of uniform diameter to receive the head of a screw and a screw threaded perforation, parallel with the wall of said recess, to receive the shank of the screw and another perforation parallel with the threaded perforation, terminating within said recess, to receive a wire to be coiled around the shank of the screw and a clamping screw having a part to coil a wire around its shank without drawing it inwardly into contact with the threads of said shank and having a flat head of uniform diameter whereby to clamp the wire after coiling it.

2. A wire coiling and binding clamp comprising a relatively stationary screw threaded member; a wire holding means adjacent thereto; a rotatable screw threaded member having a part to engage and coil the wire and a wire stop to gage the length of the wire to be coiled.

3. A wire coiling and binding clamp comprising a relatively stationary screw threaded member; a wire holding means adjacent thereto; a rotatable screw threaded member having a part to engage and coil the wire and a wire stop carried by said rotary member to gage the length of wire to be coiled.

4. A wire coiling and binding clamp comprising a relatively stationary screw threaded clamping member, perforated for insertion of a wire, and a rotatable screw threaded clamping member having a part displaced to provide a wire-engaging shoulder to coil the wire and extended to provide a stop to gage the length of the wire to be coiled.

5. A wire coiling and binding clamp comprising a screw member having a threaded shank, and a head having a hook-like projection at its periphery lying in a plane at right angles to the axis of the shank for engaging and coiling a wire.

6. A wire coiling and binding clamp comprising a screw member having a threaded shank, and a head having a hook-like projection at its periphery extending in a plane at right angles to the axis of the shank for engaging and coiling a wire, the under surface of the head being flat and lying in a plane at right angles to the axis of the shank for clamping the coiled wire.

7. A wire coiling and binding screw having a shank, and a head having a hook-like projection on its peripheral portion extending in the direction of screw rotation and positioned entirely above the under surface of the head.

8. A wire coiling and binding clamp comprising a relatively stationary clamping member providing a recess to receive the head of a screw, and having a perforation parallel with the wall of said recess to receive the shank of the screw, said member having another perforation terminating within said recess to receive a wire to be coiled around the shank of the screw, and a clamping screw having a part to coil a wire around its shank and having a head, the under surface of which is flat whereby to clamp the wire after it has been coiled.

9. A wire coiling and binding clamp comprising a screw member having head and threaded shank, a relatively stationary clamping member providing a recess of diameter substantially that of the screw head to receive the same and having a perforation for the shank of the screw parallel with the wall of the recess, said clamping member having another perforation terminating within the recess to receive a wire to be coiled around the shank of the screw, means carried by said screw for coiling the wire around its shank, the under surface of the head of the screw being flat and lying in a plane at right angles to the axis of the shank whereby to clamp the wire after it has been coiled.

10. A wire coiling and binding clamp comprising a relatively stationary clamping member having a recess to receive the head of a screw, the bottom of the recess being flat and having a perforation to receive the shank of the screw and another perforation terminating within the recess to receive a wire to be coiled around the shank of the screw, and a clamping screw having means to coil a wire around its shank and having a head, the under surface of which is flat whereby to coöperate with the flat bottom of the recess and clamp the wire after it has been coiled.

11. A binding terminal construction comprising a binding screw having a head with flat under surface and a recess to receive the end of a conductor to wrap it about the shank of the screw, and a member having a recess to receive the head of the screw and to hold the end of the conductor adjacent the shank of the screw.

12. A binding terminal construction comprising a binding screw having a head with a flat under side and a recess to receive the end of a conductor to wrap it about the shank of the screw, and a sheet metal member having a pocket formed therein to receive the shank of the screw to hold the end of the conductor adjacent the shank of the screw.

In testimony whereof I hereunto set my hand in the presence of two subscribing witnesses.

JOHN CUTHBERT.

In the presence of—
STANLEY W. COOK,
MARY F. ALLEN.